United States Patent [19]

Priddy et al.

[11] Patent Number: 5,477,045

[45] Date of Patent: * Dec. 19, 1995

[54] DYNAMICALLY VARIABLE MACHINE READABLE BINARY CODE AND METHOD FOR READING AND PRODUCING THEREOF

[75] Inventors: Dennis G. Priddy, Safety Harbor; Robert S. Cymbalski, Clearwater, both of Fla.

[73] Assignee: International Data Matrix, Inc., Clearwater, Fla.

[ * ] Notice: The portion of the term of this patent subsequent to Oct. 1, 2008, has been disclaimed.

[21] Appl. No.: 264,856

[22] Filed: Jun. 23, 1994

Related U.S. Application Data

[63] Continuation of Ser. No. 907,769, Jun. 30, 1992, Pat. No. 5,329,107, which is a continuation of Ser. No. 627,080, Dec. 13, 1990, Pat. No. 5,126,542, which is a continuation of Ser. No. 513,362, Apr. 24, 1990, Pat. No. 5,033,609, which is a continuation of Ser. No. 190,205, May 5, 1988, Pat. No. 4,939,354.

[51] Int. Cl.⁶ .......................... G06K 19/06; G06K 7/10
[52] U.S. Cl. ............................ 235/494; 235/456
[58] Field of Search ...................... 235/436, 456, 235/494, 437, 432, 470; 380/55; 369/180; 371/43; 341/95

[56] References Cited

U.S. PATENT DOCUMENTS

| | | | |
|---|---|---|---|
| 3,632,995 | 1/1972 | Wilson | 235/61.12 |
| 3,660,641 | 5/1972 | Levasseur | 235/61.12 N |
| 3,763,467 | 10/1973 | Cash | 340/146.3 |
| 3,801,775 | 4/1974 | Acker et al. | 235/61.11 |
| 3,845,279 | 10/1974 | Rosdorff | 235/61.12 N |
| 3,894,756 | 7/1975 | Ward | 283/7 |
| 4,014,300 | 9/1976 | North et al. | 283/70 |
| 4,113,993 | 9/1978 | Heckman et al. | 179/90 B |
| 4,254,329 | 3/1981 | Gokey et al. | 235/379 |
| 4,263,504 | 4/1981 | Thomas | 235/94 |
| 4,286,146 | 8/1981 | Uno et al. | 235/456 |
| 4,430,563 | 2/1984 | Harrington | 235/494 |
| 4,439,672 | 3/1984 | Salaman | 235/463 |
| 4,488,679 | 12/1984 | Bockholt et al. | 235/469 |
| 4,542,288 | 9/1985 | Drexler | 235/487 |

(List continued on next page.)

FOREIGN PATENT DOCUMENTS

| | | | |
|---|---|---|---|
| 203659 | 12/1986 | European Pat. Off. | 235/456 |
| 227473 | 7/1987 | European Pat. Off. | 235/456 |
| 0278740 | 8/1988 | European Pat. Off. | 235/456 |
| 1248981 | 8/1963 | Germany | 235/456 |
| 2906456 | 10/1980 | Germany | 235/456 |
| 3604779A1 | 8/1987 | Germany . | |
| 968808 | 9/1964 | United Kingdom . | |
| 1168857 | 10/1969 | United Kingdom | 235/456 |
| WO85/02284 | 5/1985 | WIPO | 235/456 |
| 8605906 | 10/1986 | WIPO | 295/456 |

OTHER PUBLICATIONS

Gruidel, Honomichl, Lujan "Variable Grid Detection", *IBM Technical Disclosure Bulletin*, vol. 25, No. 3B, Aug. 1982.
Veritec, Inc. Brochures. Oct. 1986.
UPC Shipping Container Symbol Specification, Oct. 1984.
UPC Shipping Container Symbol Specification, Nov. 1987.
AIM USD-5 Uniform Symbol Description 5 1982.
King et al. "Photographic Techniques For Information Storage", Oct. 1953, pp. 1421–1428.

*Primary Examiner*—Donald Hajec
*Assistant Examiner*—Thien Minh Le
*Attorney, Agent, or Firm*—Davis Hoxie Faithfull & Hapgood

[57] ABSTRACT

A machine readable binary code which is dynamically variable in size, format and density of information is provided. The binary code is formed as a matrix having a perimeter and data contained therein. The perimeter is provided with density indicia for indicating the density of data contained within the matrix. The perimeter is also provided with size indicia for indicating the size of the matrix. By utilizing the density indicia and size indicia, a scanning device is able to calculate the size and information density of the binary code.

79 Claims, 3 Drawing Sheets

U.S. PATENT DOCUMENTS

| | | | |
|---|---|---|---|
| 4,554,529 | 11/1985 | Moriyama et al. | 341/95 |
| 4,634,850 | 1/1987 | Pierce et al. | 235/487 |
| 4,652,730 | 3/1987 | Marshall | 235/436 |
| 4,692,603 | 9/1987 | Brass et al. | 235/454 |
| 4,693,154 | 9/1972 | Kubo et al. | 340/146.3 |
| 4,695,991 | 9/1987 | Hudson | 369/44 |
| 4,707,681 | 11/1987 | Eggenberger et al. | 341/95 |
| 4,728,783 | 3/1988 | Brass et al. | 235/456 |
| 4,734,565 | 3/1988 | Pierce et al. | 235/454 |
| 4,754,127 | 6/1988 | Brass et al. | 235/456 |
| 4,766,300 | 8/1988 | Chadima, Jr. et al. | 235/472 |
| 4,794,239 | 12/1988 | Allais | 235/462 |
| 4,814,589 | 3/1989 | Storch | 235/375 |
| 4,874,936 | 10/1989 | Chandler et al. | 235/494 |
| 4,924,078 | 1/1987 | Sant' Anselmo | 235/494 |
| 4,939,354 | 7/1990 | Priddy | 235/456 |
| 4,939,354 | 7/1990 | Priddy et al. | 235/465 |
| 4,947,383 | 8/1990 | Hudson | 369/44.11 |
| 4,972,475 | 11/1990 | Sant' Anselmo | 380/54 |
| 5,008,669 | 4/1991 | Ishibiski et al. | 341/95 |
| 5,053,609 | 10/1991 | Priddy | 235/456 |
| 5,124,536 | 6/1992 | Priddy et al. | 235/435 |
| 5,126,542 | 6/1992 | Priddy et al. | 235/456 |
| 5,128,526 | 7/1992 | Yoshida | 235/456 |
| 5,136,145 | 8/1992 | Karney | 235/475 |
| 5,204,515 | 4/1993 | Yoshida | 235/456 |
| 5,324,923 | 6/1994 | Cymbalski et al. | 235/494 X |
| 5,329,107 | 8/1994 | Priddy et al. | 235/484 |
| 5,343,031 | 8/1994 | Yoshida | 235/494 |
| 5,543,031 | 8/1994 | Yoshida et al. | 235/456 X |

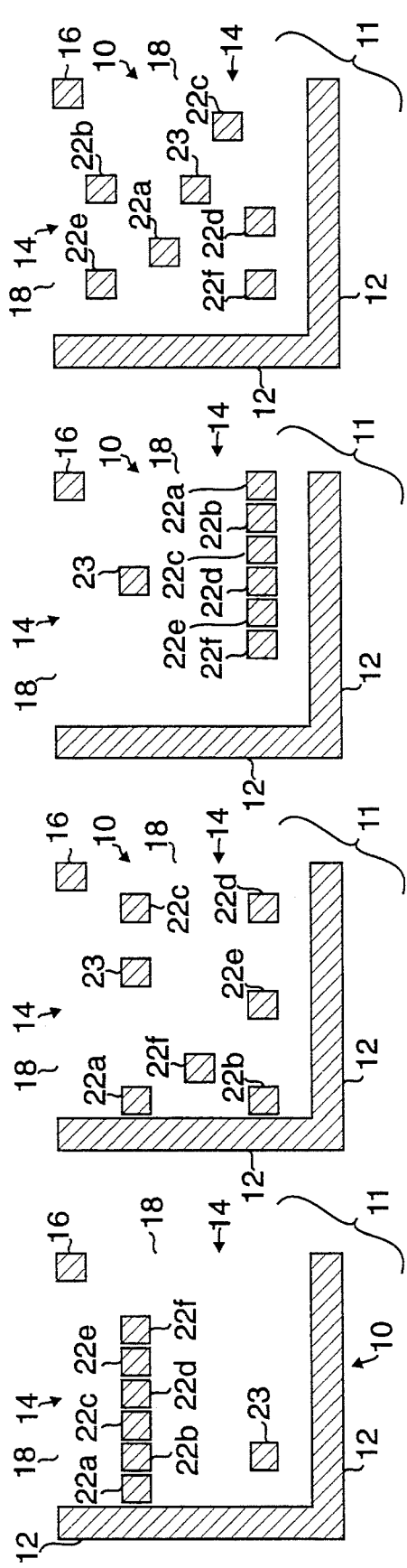
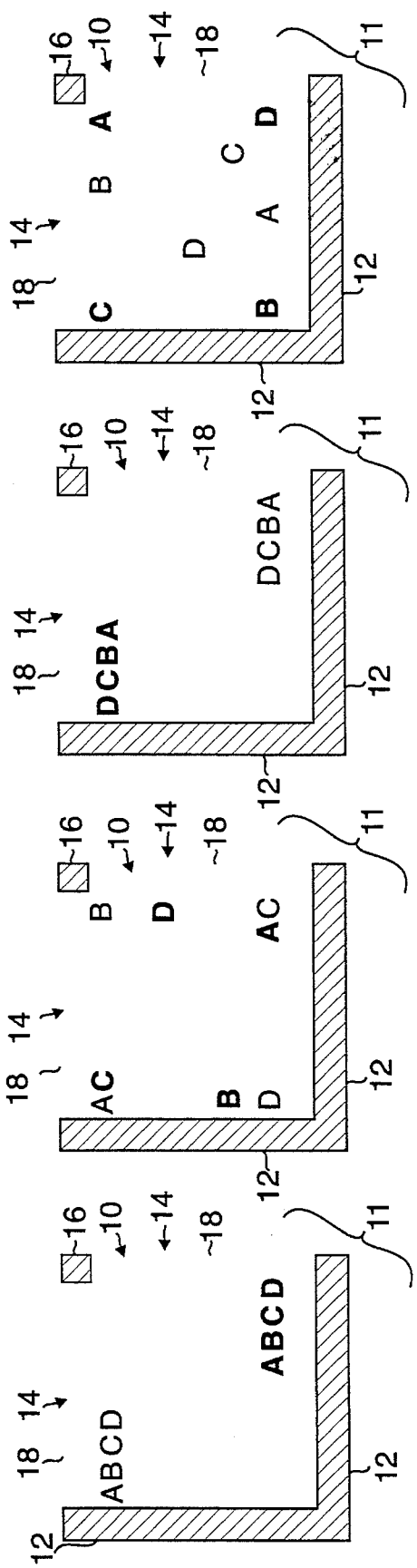

DYNAMICALLY VARIABLE MACHINE READABLE BINARY CODE AND METHOD FOR READING AND PRODUCING THEREOF

This is a continuation of U.S. patent application Ser. No. 07/907,769, filed Jun. 30, 1992 which is now U.S. Pat. No. 5,329,107; which is a continuation of U.S. patent application Ser. No. 07/627,080, filed on Dec. 13, 1990, which is now U.S. Pat. No. 5,126,542; which is a continuation of U.S. patent application Ser. No. 07/513,362, filed Apr. 24, 1990 and is now U.S. Pat. No. 5,033,609; which is a continuation of U.S. patent application Ser. No. 07/190,205, filed May 5, 1988, which is now U.S. Pat. No. 4,939,354.

BACKGROUND OF THE INVENTION

This invention relates to a binary code which is optically readable by a machine, and in particular, to a binary code which allows for dynamic variability.

Optically readable codes are known in the art. One such code is formed as a "checker board" symbol that represents information in the form of black and white squares. Each square contained within the checker board matrix is of equal size to every other square. Furthermore, the number and size of the squares contained within the matrix is predetermined, accordingly the computer receiving or producing the data expects a specific number of squares contained within the matrix each being of a preset size. This code has not been satisfactory. The code is unable to dynamically expand or contract data capacity to meet changing user requirements without the intervention of re-programming the software of the scanning computer. Accordingly, the user of the code must identify the data requirement prior to implantation of the software system. Additionally, since each square must be of the exact same size and the number of squares is predetermined, the scanning computer must be preset for the expected matrix size thereby limiting the user to a single sized checker board code for each scanner. This necessitates a plurality of code scanners and a system for separating each different sized, different density code and forwarding it to the appropriate scanner.

Codes which overcome these shortcomings by providing indicia associated with the code for informing the computer as to the size of the code are known in the art. One example of such a code is U.S. Pat. No. 3,763,467 which discloses the optical reading of data set up in box fashion upon a card. The card is marked at its periphery with two field defining marks located at the front and trailing edges of the box indicating the size of the field containing binary code decimal data stored within the box. The first row of data within the box, forming the perimeter edge, contains format information identifying which of the columns within the box is to be read. This code has also been less than satisfactory in that it suffers from density and size problems. Even though the size of the field is variable the actual size of the characters within the field is not, accordingly a smaller field size results in smaller amounts of stored information. Furthermore, the size indicia being read must be in a particular location in order to be received and understood by the scanning equipment.

Accordingly, it is desirable to provide a dynamically variable machine optically readable binary code and method for reading and producing thereof which overcomes the shortcomings of the prior art devices described above.

SUMMARY OF THE INVENTION

Generally speaking, in accordance with the invention, an optically readable binary code which is dynamically variable in size, format and density of information is provided. The code is formed of a matrix containing data having a first side and a second side each being formed of identical broken line patterns of alternating darkened and lightened areas. The first side and second side intersect at a first corner. The product of the number of lightened areas and darkened areas of the first side and the number of lightened areas and darkened areas of the second side corresponds to the amount of information contained within the code. A third side and a fourth side are each formed as a solid line of equal darkness intersecting at a second corner. The solid lines correspond to the length, height and area of the code.

The information contained within the code perimeter may appear once or a number of times providing redundancy in the recorded information. The information may also be stored in a plurality of patterns within the matrix.

The code is read by an optical scanner and by measuring the solid black lines the physical size of the matrix is determined. By scanning the broken line pattern of the other perimeter sides, the amount of information contained within the matrix may be determined. The computer may then independently determine both size and density of the matrix being scanned.

Accordingly, it is an object of this invention to provide an improved optically readable binary code.

Another object of this invention is to provide an optically readable binary code which allows a scanning computer to independently recognize, understand and act upon the encoded information regardless of the actual physical size or volume of data contained within the symbol.

A further object of this invention is to provide an optically readable binary code which may be read and processed regardless of the angle orientation of the symbol to the scanner.

Yet another object of this invention is to provide an optically readable binary code which may dynamically encode large quantities of information in any physical size.

Still another object of this invention is to provide an optically readable binary code which enables the computer to independently recognize and decode the information contained within the code regardless of the physical size, data density, or angle of rotation of the code relative to the reader.

Yet another object of this invention is to provide an optically readable binary code which allows the density of the code matrix to be dynamically determined and computer generated without requiring user involvement.

Yet another object of the present invention is to provide an optically readable binary code and method for processing thereof which gives the user absolute control over a selection of a physical size of the code as well as the volume of the data which is encoded therein.

Still other objects and advantages of the invention will in part be obvious and will in part be apparent from the specification and drawings.

The invention accordingly comprises the several steps in their relation of one or more such steps with respect to each of the others and the article possessing features, properties and relation of elements, which are exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which:

FIGS. 2a–2d illustrate the arrangement of data within the perimeter of the binary code in accordance with the invention;

FIGS. 3a–3d illustrate the redundant formation of visual cells within the matrix in accordance with the invention;

DETAILED DESCRIPTION OF THE PREFERRED EMBODIMENT

Figure 1B:
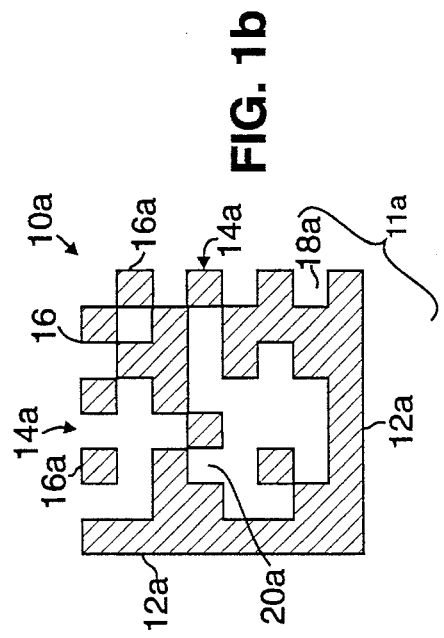
FIGS. 1a and 1b depict two binary codes in accordance with the invention; of different sizes, but containing the same information.
Figure 1A:
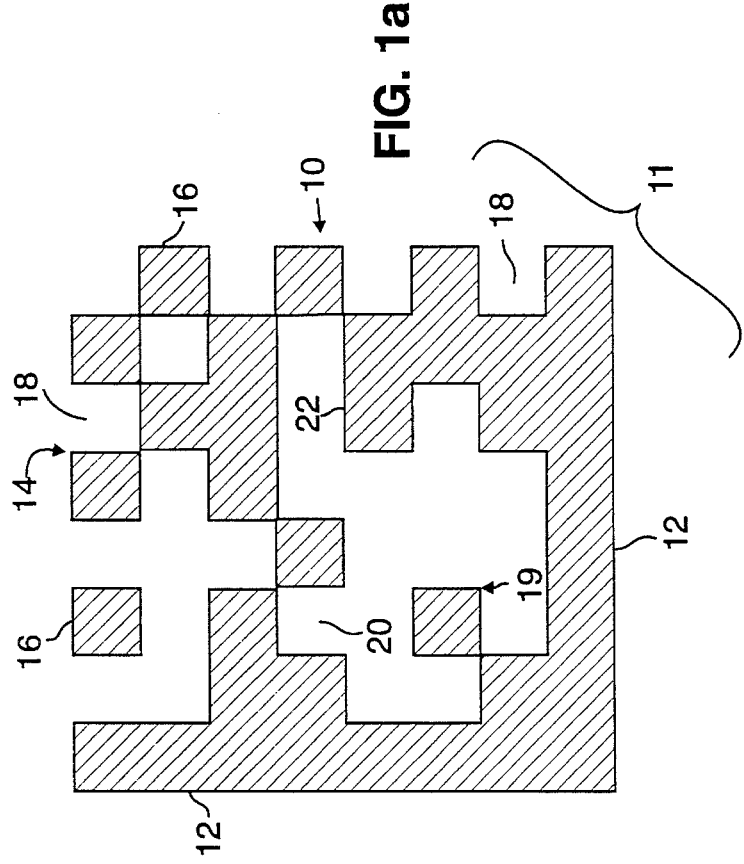

Reference is made to FIG. 1a, wherein a binary code, generally indicated as a matrix 10, constructed in accordance with the invention is presented. Binary code matrix 10 has a perimeter 11 formed by intersecting sides 12 formed of solid lines and intersecting perimeter sides 14 formed of dark perimeter squares 16 and light perimeter squares 18 in an alternating pattern. Data, generally indicated as 19, is stored within perimeter 11 of matrix 10.

Data 19 is stored within the perimeter of matrix 10 by converting each character to be stored into a visual binary code represented by dark and light squares corresponding to ones and zeros of binary information. Accordingly, a letter or number represented by the binary code 0001 may be represented by a string of data cells, each cell containing either a dark square or light square. Accordingly, the data representing 0001 would appear as a series of three light data cells and one dark data cell. For example, the numbers 0 through 9 are stored within matrix 10 as a pattern of light cells 20 and dark cells 22.

Binary representation of the one hundred twenty-eight (128) US-ASCII letters, numbers and symbols requires eight binary bits, or in the case of matrix 10, eight visual squares or cells to represent a character. However, by defining the maximum range of characters that may appear at each position of the input string, it is possible to suppress those binary bits which contain information redundant and common to the entire range of characters thereby compressing the required number of visual squares to represent a single character to less than eight. In one embodiment, in which only the letters A through D are anticipated to appear in the first position of an input string, only two visual squares are required to reflect the four possible binary bit configurations. Where the presence of a dark cell is indicated by "D" and the light cell is indicated by "L," the letter A would be represented as LD. The letter B would be represented as DL, the letter C as DD and the letter D as LL, all represented by using only two cells of visual binary information. Similarly, if in a second character position of the input string it is known that only numeric values from 0 through 9 will appear, only four visual cells need be reserved to accommodate the ten possible binary variations for forming this character. Accordingly, in the above embodiment, a total of six visual squares or cells need be reserved to reflect the two characters of encoded information rather than the sixteen cells of the US-ASCII system.

The size of the square and the number of cells contained within the perimeter of the square are determined from the code perimeter 11. Solid lines 12 indicate the physical size of matrix 10.

For ease of explanation a square matrix 10 having equal sides 12 is presented. However any parallagram, such as a rectangle, having an area computable by length and height may be used.

Side 14 indicates the density or number of cells 20, 22 contained within matrix 10. The number of alternating squares 16, 18 beginning with first light square 18 adjacent each perimeter line 12, corresponds to the square root of the number of visual cells 20, 22 contained within the perimeter of matrix 10 rounded up to the nearest number. In this example the square adjacent perimeter line 12 is a light square 18, however, in a matrix having a different number of cells 20, 22 contained therein side 14 may begin with a dark square 16 to obtain an appropriate value for the number of alternating squares 16, 18.

In an exemplary embodiment, the numerals 0 through 9 are encoded within matrix 10 utilizing thirty-six visual cells 20, 22 and being encased in a matrix 10 having a perimeter side 14 containing six alternating dark squares 16 and light squares 18. By providing a perimeter which indicates the matrix size as well as the number of visual cells contained within matrix 10 and in binary form, a binary code matrix 10 is provided which, as will be discussed below, is recognizable and identifiable by a scanning computer regardless of physical size or information density.

By comparison, a matrix 10A depicted in FIG. 1b contains the same information in the same format as matrix 10 and has a perimeter 11a but at a smaller scale having smaller perimeter sides 12a and 14a. Accordingly, physical size of the code may be unlimited. By providing a format for indicating to the scanning computer the size and density of the matrix in machine readable form, machine readability of a variety of different size and information density binary codes by a single optical scanner computer system is possible. In exemplary embodiments, the physical size may range from one-tenth of an inch square to seven inches square, but is limited only by the ability of the user's print device to create the selected size.

Reference is now also made to FIGS. 2a through 2d in which the arrangement of visual cells 22 within matrix 10 is depicted, like elements from FIG. 1a being assigned like reference numerals. A character may be represented by dark visual cells 22a, 22b, 22c, 22d and 22e. Visual cells 22a through 22e may be situated in a variety of patterns within matrix 10. Visual cells 22 may be in serial order in one corner of matrix 10 (FIG. 2a), visual cells 22 may be scattered about in each corner of matrix 10 (FIG. 2b), visual cells 22 may be in reverse serial order in a corner of matrix 10 (FIG. 2c) or they may be randomly distributed within matrix 10 (FIG. 2d). Each matrix 10 may be keyed to a specific visual cell placement depending upon the needs of each specific user. This enables a user to have patterns which are readable by either all users of a binary code, or only by specific users of the binary code, as for example, in top secret verification facilities. A key 23 for determining which pattern is used, is encoded in visual cells contained within perimeter 11 of matrix 10 at a known reference position within matrix 10. For example, key visual cell 23 may be a certain distance from the intersection of solid lines 12. Additionally, a mixture of both public and secret patterns may be present within the same structure to enable the general public to read part of what is contained within the matrix 10 and only certain sections of the public to read what is contained within the rest of matrix 10. In a preferred embodiment, there are 256 pattern variations for situating visual cells 22, 23 within matrix 10.

Data 19 may also be stored more than once providing the redundancy in the information as encoded within matrix 10. Varying levels of redundancy may be provided by selectively increasing the number of visual cells A, B, C, D corresponding to visual cells 20, 22 which are utilized to represent a particular character. At least a three bit differential between bit patterns of respective characters of data is utilized so that if a single visual cell 20 or 22 is obliterated there is still a two bit difference between the bit cell composition representing respective desired characters. The unique bit combination so generated also provides the greatest differentiation between represented characters. Therefore, redundancy is provided by expanding the number of data bit cells and corresponding visual cells to represent a particular character. The redundancy may range from a factor of no redundancy to 400% redundancy. Furthermore, as illustrated in FIGS. 3a–3d the redundancy need not be in the same pattern as the root cells. Visual cells A, B, C, D are positioned within matrix 10 a plurality of times. The root cell, shown by the darker letters, may be replicated in a mirror image (FIGS. 3a, 3b, 3c) or in a random pattern (FIG. 3d) as long as identical visual cells such as A, A are not adjacent each other. Accordingly, through redundancy the code is not lost if a portion of the matrix is destroyed or deformed during normal transit or use.

Figure 4:
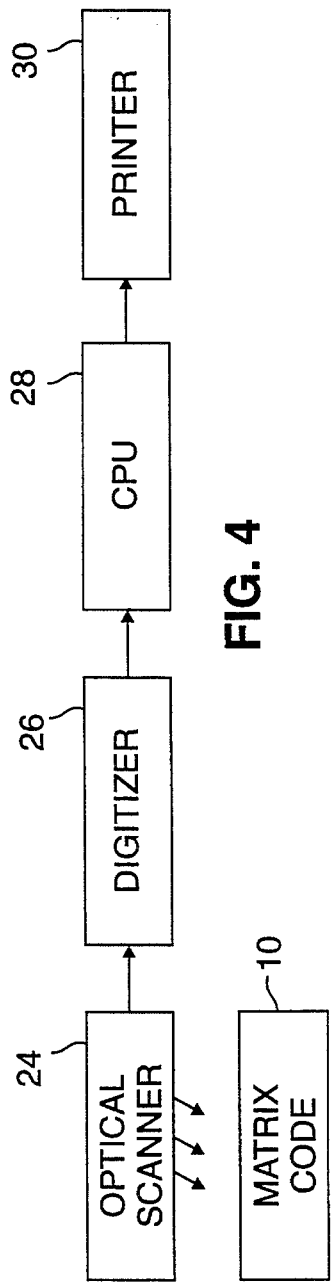
FIG. 4 is a block diagram of an apparatus for processing and scanning the code in accordance with the invention.

Matrix 10 may be read by the apparatus of FIG. 4. The visual image of matrix 10, along with it's surrounding area, is captured by an optical scanner 24 which converts the visual image into a series of electronic impulses. Scanner 24 may be a light sensitive electronic array, optical CCD camera, linear array scanner, laser reader adapted for two dimensional scanning or the like.

The electronic impulses produced by scanner 24 are transmitted to a digitizer 26 which converts these electronic impulses into a series of computer recognizable binary data bits corresponding to the scanned image. Each visual cell is assigned a binary numeric value based upon the strength of light sensed by optical scanner 24. Visual cells which are absolute black and absolute white are assigned the highest and lowest values respectively, while shades in between are assigned incremental values forming an electronic image of the scanned matrix 10. This image is transmitted to a central processing unit of a computer 28 ("CPU") which stores a bit mapped image of matrix 10 and a part of its surrounding area as a reference within its memory.

Matrix 10 is not always scanned in a readily discernable orientation relative to scanner 24. Accordingly, CPU 28 conducts a binary search to locate the encoded pattern and determine the orientation of matrix 10 as stored in CPU 28. The uniqueness of perimeter 11 of matrix 10 affords a reference point. Each matrix 10 contains two solid dark sides 12. CPU 28 searches for either solid dark side 12 and upon finding it searches for the intersection of the dark sides 12. By locating the corner at which sides 12 intersect, CPU 28 identifies the specific location of matrix 10 regardless of size or orientation within the scanned visual field. CPU 28 then measures the length of each solid black line 12 stored within its memory and the angle at which lines 12 intersect. CPU 28 then calculates where the opposite corner of matrix 10 is located. By utilizing the length and angle of intersection of sides 12, matrix 10 is always recognizable even though it may have been subjected to substantial linear deformation during the digitizing process as long as the binary image remains a parallelogram. Additionally, the uniqueness of perimeter 11 allows CPU 28 to differentiate matrix 10 from other symbols or images within the scan field.

Figure 5:
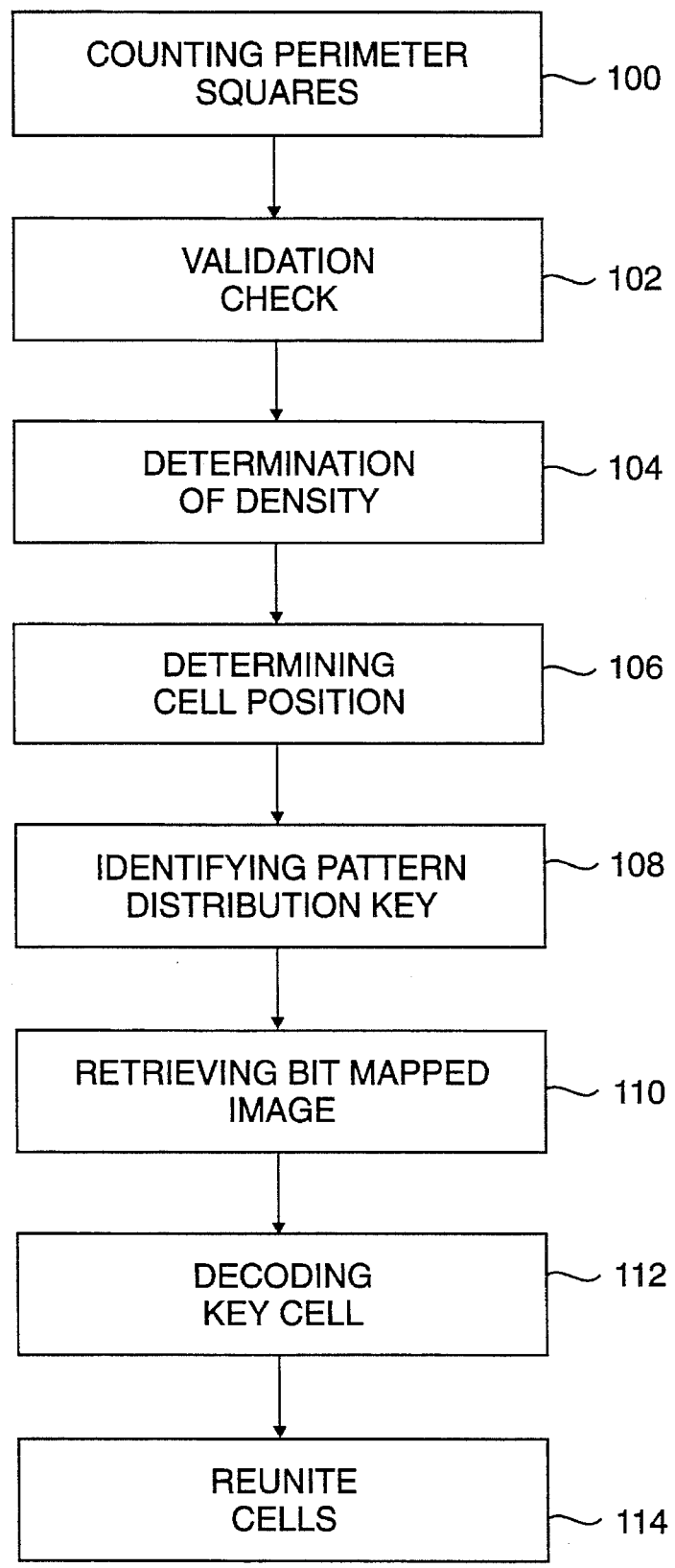
FIG. 5 is a flowchart depicting the process for reading the binary code.

Reference is now made to FIG. 5 in which a flowchart for reading and decoding matrix 10 is provided. Once the four corners of matrix 10 have been identified, CPU 28 counts the alternating dark and light squares 16, 18 of perimeter sides 14 in accordance with a step 100. As sides 14 are of an identical construction, one side 14 is used as a check against the second side 14 to validate the information contained therein in step 102. In step 104, CPU 28 calculates the product of the number of squares contained in each side 14 and determines the density of cells contained within matrix 10. By calculating the angle of the matrix, the matrix size and the matrix density, CPU 28 can calculate the position of each visual cell 20, 22 relative to the intersecting lines 12 in accordance with a step 106. Thus, the center of each visual cell 20, 22 can be determined. CPU 28 now knows the physical size of the pattern to be decoded, the total number of visual cells or their electronic equivalent stored as data 19 and the location of the center of each visual cell 20, 22 in relation to the four corners of matrix 10. Since physical size and cell density of matrix 10 are calculated values rather than predefined, CPU 28 may recognize and decode a matrix 10 of any physical size or density.

The pattern of data 19 is decoded by first identifying the pattern distribution key in accordance with step 108. The distribution key will always be stored as a number of visual cells located at a specific position relative to the corners of matrix 10. Accordingly, in step 110, once the orientation of matrix 10 is determined by CPU 28, CPU 28 retrieves from its bit mapped image of matrix 10 the electronic equivalent of the visually encoded key cells. Upon decoding of these key cells, as in step 112, CPU 28 is informed which of the 256 cell distribution patterns was employed to encode data 19 within matrix 10. In accordance with step 114 once the distribution pattern is determined, CPU 28 will reunite the appropriate cells to re-form the binary character strings corresponding to the binary character strings originally input for encoding.

To generate matrix 10, CPU 28 must reverse the process and first convert the 0, 1 binary language of the computer to the dark/light visual cells 20, 22 of matrix 10. CPU 28 calculates the maximum number of character variations expected at each position of the input string and then determines the minimum number of visual cells required to encode that number of variations. The compression process varies depending on the type of input character anticipated. For instance, if it is known that only numerics will appear at a given input location, the eight bit binary numbers can be compressed to 3.32 visual cells; if all alphabetic characters are anticipated, an eight bit binary letter can be compressed to 4.75 visual cells; or, if the input character could be either alphabetic or numeric the compression algorithms reduce each input character from eight binary bits to 5.21 visual cells.

Further, the system may make use of the available "partial" cells. For example, the first alphanumeric character will require six visual cells (smallest integer≧5.21) while the second alphanumeric character will require only five (10.42 cells–6 for the first character=4.42 rounded to 5). This allows for the enhanced binary compression as described above and thereby further reduces the necessary density of matrix 10. If it were known as in FIG. 1a, that the ten characters to be input were to be all numeric (0 through 9), CPU 28 would determine through use of the compression algorithm that the number of potential binary variations could be accommodated by thirty-four (34) visual cells rather than eighty (80) visual cells as would be otherwise supposed.

The user then inputs into CPU 28 the type of visual cell distribution within matrix 10 desired. The amount of desired redundancy is then input into CPU 28 ranging from no redundancy to as high as 400% repetition of the pattern. CPU 28 analyzes the pattern of the root visual cell to be encoded and positions the redundant data cells farthest from the root cell to achieve the highest probability of survival of at least one cell in the event of destruction of a part of matrix 10 (FIGS. 3a, 3b, 3c, 3d). The number of visual cells required for the encoded data is then computed and added to the number of visual cells required as distribution key cells to determine the density of matrix 10. The square root of this total is then determined to establish the number of squares required to form sides 14 of perimeter 11 of matrix 10. Finally, the user desired physical size of matrix 10 is input to determine the length of sides 12 of matrix 10. Upon calculation of all these values, CPU 28 causes a printer 30 to produce the newly generated matrix 10.

By providing a machine readable two dimensional binary code having a perimeter which indicates the physical size of the code on two of its sides and the density of the encoded material on two of its sides, a code which is dynamically variable as to size and density of information contained therein is provided.

It will thus be seen that the objects set forth above, among those made apparent from the preceding description, are additionally attained and, since certain changes may be made in carrying out the above process and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, is a matter of language, might be said to fall therebetween.

What is claimed is:

1. An apparatus for reading a dynamically variable machine optically readable code, said code comprising data formed as a plurality of data elements forming a two dimensional array and having a perimeter, said code having a variable number of data elements and including a density indicia for determining the density of data elements contained within the code, said density indicia being disposed in said code independently of the positioning of said data elements comprising said data, said density indicia being a function of the number of data elements comprising data in said code and said apparatus operating on said density indicia to determine the density of data contained within said code.

2. The apparatus of claim 1 wherein the density indicia is formed of a first pattern and a second pattern, each pattern having a number of data elements having distinguishable values, wherein the product of the number of data elements in the first pattern and the number of data elements in the second pattern identifies the density of data.

3. The apparatus of claim 2 wherein the first and second patterns further comprise two lines of data elements each having alternating light area and dark area data elements.

4. The apparatus of claim 3 wherein the two lines are disposed in the code perimeter and intersect at a corner of the perimeter.

5. The apparatus of claim 4 wherein the two lines have identical alternating light area and dark area patterns.

6. The apparatus of claim 5 further comprising means for optically scanning a visual field capable of containing said code and determining therefrom the density indicia.

7. The apparatus of claim 6 wherein the optically scanning means further comprises a source of radiation directed to illuminate the visual field, wherein the optically scanning means detects radiation reflected from the visual field in response to the illuminating radiation.

8. The apparatus of claim 7 wherein the optically scanning means further comprises a laser reader having a source of laser radiation and means for illuminating the visual field with the laser radiation.

9. The apparatus of claim 6 wherein the optically scanning means further comprises a light sensitive electronic array.

10. The apparatus of claim 9 wherein the light sensitive electronic array further comprises a light sensitive area array and a lens to focus an image of the visual field onto the area array, wherein a two-dimensional image is captured by the area array.

11. The apparatus of claim 10 wherein the light sensitive area array and lens further comprise an optical CCD camera.

12. The apparatus of claim 9 wherein the light sensitive array further comprises a light sensitive linear array, wherein a two-dimensional image is captured in response to the linear array being moved across the visual field.

13. The apparatus of claim 7 wherein the optically scanning means further comprises a light sensitive electronic array.

14. The apparatus of claim 13 wherein the light sensitive electronic array further comprises a light sensitive area array and a lens to focus an image of the visual field onto the area array, wherein a two-dimensional image is captured by the area array.

15. The apparatus of claim 14 wherein the light sensitive area array and lens further comprise an optical CCD camera.

16. The apparatus of claim 13 wherein the light sensitive array further comprises a light sensitive linear array, wherein a two-dimensional image is captured in response to the linear array being moved across the visual field.

17. The apparatus of claim 1 wherein the perimeter of the code further comprises a size indicia for determining the physical size of the code and said apparatus operates on said size indicia to determine the physical size of the code.

18. The apparatus of claim 17 wherein said binary code further comprises an orientation indicia and said apparatus operates on said orientation indicia to determine the orientation of the code relative to a visual field in which said matrix is disposed.

19. The apparatus of claim 17 wherein said binary code further comprises an indicia indicating the distribution pattern of the data within the code, and said apparatus operates on said indicia to determine the distribution of data within the code.

20. The apparatus of claim 17 wherein the size indicia further comprises a first side of the perimeter and a second side of the perimeter, the first and second sides being solid lines and intersecting at a first corner.

21. The apparatus of claim 20 wherein the density indicia further comprises a third side and a fourth side of the perimeter intersecting at a second corner, each of the third and fourth sides being formed of a pattern of alternating light area and dark area data elements, wherein the operating means further comprises means for counting the number of alternating light areas and dark areas in the third and fourth sides and calculating therefrom a product corresponding to the number of data elements comprising data in the code.

22. The apparatus of claim 21 wherein the code further comprises data arranged in a predetermined pattern and a pattern distribution key identifying the predetermined pattern, said operating means further comprising means for identifying the pattern distribution key in said code, and means for decoding the data elements of the code using said pattern distribution key.

23. An apparatus for reading a machine optically readable code, said code comprising data formed as a plurality of data elements having a perimeter, the perimeter including a size indicia as a first side of the perimeter and a second side of the perimeter, said first side and second side each being formed of a solid line, the first side and second side intersecting at a first corner and corresponding to the orientation of the code relative to a visual field within which said code is disposed, said apparatus having means for reading said code and means for operating on said size indicia and determining the physical size of the code and the distortion of the code.

24. The apparatus of claim 23 wherein the code further comprises a density indicia for determining the density of data contained within the code, said density indicia being disposed in said code independently of the positioning of said data elements comprising data, said density indicia being a function of the number of data elements comprising data in said code and said apparatus operating on said density indicia to determine the density of data contained within said code.

25. The apparatus of claim 24 wherein the density indicia is formed of two patterns of data elements not comprising data, each pattern having a number of data elements that are optically distinguishable, wherein the product of the number of data elements in the two patterns identifies the density of data.

26. The apparatus of claim 25 wherein said two patterns further comprises two lines of data elements.

27. The apparatus of claim 26 wherein said two lines of the density indicia are disposed in the perimeter and intersect at a corner of the perimeter.

28. The apparatus of claim 26 wherein the means for reading the code further comprises means for optically scanning a visual field capable of containing a code and determining therefrom the orientation indicia.

29. The apparatus of claim 28 wherein the optically scanning means further comprises a source of radiation directed to illuminate the visual field, wherein the optically scanning means detects radiation reflected from the visual field in response to the illuminating radiation.

30. The apparatus of claim 29 wherein the optically scanning means further comprises a laser reader having a source of laser radiation and means for illuminating the visual field with the laser radiation.

31. The apparatus of claim 28 wherein the optically scanning means further comprises a light sensitive electronic array.

32. The apparatus of claim 31 wherein the light sensitive electronic array further comprises a light sensitive area array and a lens to focus an image of the visual field onto the area array, wherein a two-dimensional image is captured by the area array.

33. The apparatus of claim 32 wherein the light sensitive area array and lens further comprise an optical CCD camera.

34. The apparatus of claim 31 wherein the light sensitive array further comprises a light sensitive array, wherein a two-dimensional image is captured in response to the linear array being moved across the visual field.

35. The apparatus of claim 29 wherein the optically scanning means further comprises a light sensitive electronic array.

36. The apparatus of claim 35 wherein the light sensitive electronic array further comprises a light sensitive area array and a lens to focus an image of the visual field onto the area array, wherein a two-dimensional image is captured by the area array.

37. The apparatus of claim 36 wherein the light sensitive area array and lens further comprise an optical CCD camera.

38. The apparatus of claim 35 wherein the light sensitive array further comprises a light sensitive linear array, wherein a two-dimensional image is captured in response to the linear array being moved across the visual field.

39. An apparatus for reading a machine optically readable code disposed within a visual field, said code comprising data formed as a plurality of data elements having a perimeter and a size indicia indicating the physical size of the code, the apparatus operating on the size indicia to determine the physical size of the code, the code further including an orientation indicia, the apparatus further operating on the orientation indicia to determine the orientation of the code relative to a visual field in which the code is disposed, the orientation indicia including a first side of the perimeter, a second side of the perimeter, said first and second sides each being formed of a solid line, the first side and second side intersecting a first angle, said first angle defining the orientation of the matrix.

40. The apparatus of claim 39 wherein the first and second sides form a corner of the code perimeter.

41. The apparatus of claim 40 wherein the first and second sides are of equal length.

42. The apparatus of claim 40 wherein the size indicia is disposed in the perimeter of the code.

43. The apparatus of claim 42 wherein the size indicia and the orientation indicia comprise the same first and second solid lines.

44. The apparatus of claim 43 wherein the means sensor scanning means further comprising means for optically scanning a visual field capable of containing a code and determining therefrom the size indicia.

45. The apparatus of claim 44 wherein the optically scanning means further comprises a source of radiation directed to illuminate the visual field, wherein the optically scanning means detects radiation reflected from the visual field in response to the illuminating radiation.

46. The apparatus of claim 45 wherein the optically scanning means further comprises a laser reader having a source of laser radiation and means for illuminating the visual field with the laser radiation.

47. The apparatus of claim 44 wherein the optically scanning means further comprises a light sensitive electronic array.

48. The apparatus of claim 47 wherein the light sensitive electronic array further comprises a light sensitive area array and a len to focus an image of the visual field onto the area array, wherein a two-dimensional image is captured by the area array.

49. The apparatus of claim 48 wherein the light sensitive area array and lens further comprise an optical CCD camera.

50. The apparatus of claim 47 wherein the light sensitive array further comprises a light sensitive linear array, wherein a two-dimensional image is captured in response to the linear array being moved across the visual field.

51. The apparatus of claim 45 wherein the optically scanning means further comprises a light sensitive electronic array.

52. The apparatus of claim 51 wherein the light sensitive electronic array further comprises a light sensitive area array and a lens to focus an image of the visual field onto the area array, wherein a two-dimensional image is captured by the area array.

53. The apparatus of claim 52 wherein the light sensitive area array and lens further comprise an optical CCD camera.

54. The apparatus of claim 51 wherein the light sensitive array further comprises a light sensitive linear array, wherein a two-dimensional image is captured in response to the linear array being moved across the visual field.

55. A method for determining the density of a dynamically variable machine readable optical symbol having a code formed of a plurality of data elements in a two dimensional array representing coded data and a perimeter including a first side and a second side, the first and second sides forming a density indicia as first and second patterns having alternating light and dark areas, the first side and second side intersecting at a first corner, the product of the number of alternating light and dark areas of the first and second sides corresponding to the density of coded data in the matrix, comprising the steps of:

scanning the symbol with an optical scanner and converting the scanned image to a bit map representative of the scanned symbol;

processing the bit-map and determining therefrom the number of alternating light and dark areas in the first and second sides respectively; and determining the product of the number of alternating cells of the first and second sides as the density of data in the code.

56. The method of claim 55 wherein the scanning step further comprises providing a light sensitive device, detecting radiation reflected from a visual field containing the code, forming a two-dimensional electronic representation of the visual field in response to the detected reflected radiation, and forming a bit map from the two-dimensional representation.

57. The method of claim 56 wherein the step of detecting radiation further comprises illuminating the visual field with radiation, wherein the detected reflected radiation is responsive to the illuminating radiation.

58. The method of claim 56 wherein the step of detecting radiation further comprises generating laser radiation, illuminating the visual field with said laser radiation, and detecting the radiation reflected in response to the laser radiation.

59. The method of claim 56 wherein the step of detecting radiation further comprises providing a light sensitive electronic array and capturing electronic data corresponding to a two-dimensional image of the visual field.

60. The method of claim 59 wherein the step of providing a light sensitive array further comprises providing light sensitive area array and a lens, focussing an image of the visual field on the area array, and capturing a two-dimensional electronic representation of the scanned visual field.

61. The method of claim 60 wherein providing a light sensitive area array and a lens further comprises providing an optical CCD camera.

62. The method of claims 59 wherein the step of providing a light sensitive array further comprises providing a linear array, and moving the linear array across the visual field and capturing a two-dimensional electronic representation of the visual field in response to said movement.

63. The method of claim 57 wherein the step of detecting radiation further comprises providing a light sensitive electronic array and capturing electronic data corresponding to a two-dimensional image of the visual field.

64. The method of claim 63 wherein the step of providing a light sensitive array further comprises providing light sensitive area array and a lens, focussing an image of the visual field on the area array, and capturing a two-dimensional electronic representation of the scanned visual field.

65. The method of claim 64 wherein providing a light sensitive area array and a lens further comprises providing an optical CCD camera.

66. The method of claim 63 wherein the step of providing a light sensitive array further comprises providing a linear array, and moving the linear array across the visual field and capturing a two-dimensional electronic representation of the visual field in response to said movement.

67. A method for determining the size of a dynamically variably machine optically readable symbol having a code formed of a plurality of data elements in a two dimensional array representing coded data and a perimeter having a first side and a second side, the first side and second side each being formed of a solid line and intersecting at a first corner, and determining the location of each data element of data of the symbol comprising:

scanning the symbol with an optical scanner and converting the scanned image to a bit map representative of the scanned image of the symbol;

processing the bit map and determining the length of the first and second sides and the angle formed between the first and second sides; and determining the location of each data element of coded data in the code by compensating for any linear distortion based on the determined angle.

68. The method of claim 67 wherein determining the location of each data element further comprises determining the physical center of each data element.

69. The method of claim 67 wherein the scanning step further comprises providing a light sensitive device, detecting radiation reflected from a visual field containing the code, forming a two-dimensional electronic representation of the visual field in response to the detected reflected radiation, and forming the bit map from the two-dimensional electronic representation.

70. The method of claim 69 wherein the step of detecting radiation further comprises illuminating the visual field with radiation, wherein the detected reflected radiation is responsive to the illuminating radiation.

71. The method of claim 69 wherein the step of detecting radiation further comprises generating laser radiation, illuminating the visual field with said laser radiation, and detecting the radiation reflected in response to the laser radiation.

72. The method of claim 68 wherein the step of detecting radiation further comprises providing a light sensitive electronic array and capturing electronic data corresponding to a two-dimensional image of the visual field.

73. The method of claim 72 wherein the step of providing a light sensitive array further comprises providing light sensitive area array and a lens, focussing an image of the visual field on the area array, and capturing a two-dimensional electronic representation of the scanned visual field.

74. The method of claim 73 wherein providing a light sensitive area array and a lens further comprises providing an optical CCD camera.

75. The method of claim 72 wherein the step of providing a light sensitive array further comprises providing a linear array, and moving the linear array across the visual field and capturing a two-dimensional electronic representation of the visual field in response to said movement.

76. The method of claim 70 wherein the step of detecting radiation further comprises providing a light sensitive electronic array and capturing electronic data corresponding to a two-dimensional image of the visual field.

77. The method of claim 76 wherein the step of providing a light sensitive array further comprises providing light sensitive area array and a lens, focussing an image of the visual field on the area array, and capturing a two-dimensional electronic representation of the scanned visual field.

78. The method of claim 77 wherein providing a light sensitive area array and a lens further comprises providing an optical CCD camera.

79. The method of claim 76 wherein the step of providing a light sensitive array further comprises providing a linear array, and moving the linear array across the visual field and capturing a two-dimensional electronic representation of the visual field in response to said movement.

* * * * *